US012611730B2

(12) United States Patent
Sakamoto et al.

(10) Patent No.: US 12,611,730 B2
(45) Date of Patent: Apr. 28, 2026

(54) LASER MACHINING APPARATUS AND LASER MACHINING METHOD

(71) Applicant: HAMAMATSU PHOTONICS K.K., Hamamatsu (JP)

(72) Inventors: Takeshi Sakamoto, Hamamatsu (JP); Katsuhiro Korematsu, Hamamatsu (JP); Takafumi Ogiwara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 686 days.

(21) Appl. No.: 18/014,828

(22) PCT Filed: Jul. 13, 2021

(86) PCT No.: PCT/JP2021/026367
§ 371 (c)(1),
(2) Date: Jan. 6, 2023

(87) PCT Pub. No.: WO2022/014619
PCT Pub. Date: Jan. 20, 2022

(65) Prior Publication Data
US 2024/0238897 A1 Jul. 18, 2024

(30) Foreign Application Priority Data

Jul. 15, 2020 (JP) ................................. 2020-121657

(51) Int. Cl.
*B23K 26/067* (2006.01)
*B23K 26/04* (2014.01)
*B23K 26/53* (2014.01)

(52) U.S. Cl.
CPC .......... *B23K 26/0676* (2013.01); *B23K 26/04* (2013.01); *B23K 26/53* (2015.10)

(58) Field of Classification Search
CPC .............. B23K 26/0046; B23K 26/067; B23K 26/0676; B23K 26/53; B23K 26/04
See application file for complete search history.

(56) References Cited

U.S. PATENT DOCUMENTS

2017/0113301 A1 4/2017 Sakamoto et al.

FOREIGN PATENT DOCUMENTS

CN 105209219 A 12/2015
CN 106463374 A 2/2017
(Continued)

OTHER PUBLICATIONS

International Preliminary Report on Patentability mailed Jan. 26, 2023 for PCT/JP2021/026367.

*Primary Examiner* — Thien S Tran
(74) *Attorney, Agent, or Firm* — Faegre Drinker Biddle & Reath LLP

(57) ABSTRACT

This laser processing apparatus includes an irradiation unit and a controller. The irradiation unit has a spatial light modulator and a converging part. The controller executes first control for causing the laser light to be modulated such that the laser light is branched into a plurality of rays of processing light and a plurality of converging points of the plurality of rays are positioned in different positions in a direction perpendicular to an irradiation direction of the laser light. In the first control, the laser light is modulated such that fractures that extend from a plurality of modified spots constituting the modified region and stretch along the virtual plane to be connected to each other are present between a converging point of non-modulated light of the laser light and an opposite surface on a side opposite to a laser light incidence surface of the object in the irradiation direction.

9 Claims, 16 Drawing Sheets

(56)         References Cited

FOREIGN PATENT DOCUMENTS

| | | | |
|---|---|---|---|
| CN | 109841568 | A | 6/2019 |
| CN | 115803141 | A | 3/2023 |
| CN | 115812017 | A | 3/2023 |
| JP | H11-156568 | A | 6/1999 |
| JP | 2010-260063 | A | 11/2010 |
| JP | 2011-051011 | A | 3/2011 |
| JP | 2011-206850 | A | 10/2011 |
| JP | 5456510 | B2 | 4/2014 |
| JP | 2017-069340 | A | 4/2017 |
| KR | 20210108310 | A    * | 9/2021 |
| TW | 202016657 | | 5/2020 |
| TW | 202020952 | A | 6/2020 |
| WO | WO-2014/156688 | A1 | 10/2014 |
| WO | 2020/009072 | A1 | 1/2020 |
| WO | 2020/090901 | A1 | 5/2020 |
| WO | 2020/129569 | A1 | 6/2020 |
| WO | 2020/130109 | A1 | 6/2020 |

* cited by examiner (a)

| | COMPARATIVE EXAMPLE | EXAMPLE 1 |
|---|---|---|
| DEFOCUS POSITION | -166μm | -146μm(+20μm) |
| Z-DIRECTION SHIFT AMOUNT | 0μm | 20μm |
| DISTANCE FROM DEVICE LAYER TO CONVERGING POINT OF NON-MODULATED LIGHT | 172μm | 252μm |
| DAMAGE EVALUATION PHOTOGRAPH | | |
| EVALUATION RESULT | DAMAGE IS PRESENT | DAMAGE IS ABSENT |

| NUMBER OF BRANCHES | 2 |
|---|---|
| SHIFT DIRECTION | Z DIRECTION |

| | SLICING POSITION (μm) | Z-DIRECTION SHIFT AMOUNT (μm) | SPHERICAL ABERRATION | OUTPUT (W) |
|---|---|---|---|---|
| SS1 | Z1 | ΔZ | REFERENCE | 1.2 |
| SS2 | | | | 1.2 |

*Fig.16*

| | COMPARATIVE EXAMPLE | EXAMPLE 3 |
|---|---|---|
| INFRARED IMAGE | 12s(12) 12s(12) | FC |
| DAMAGE EVALUATION PHOTOGRAPH | | |
| EVALUATION RESULT | DAMAGE IS PRESENT | DAMAGE IS ABSENT |

LASER MACHINING APPARATUS AND LASER MACHINING METHOD

TECHNICAL FIELD

The present disclosure relates to a laser processing apparatus and a laser processing method.

BACKGROUND ART

Patent Literature 1 describes a laser processing apparatus that includes a holding mechanism that holds a workpiece and a laser irradiation mechanism that irradiates the workpiece held by the holding mechanism with laser light. In the laser processing apparatus described in Patent Literature 1, a laser irradiation mechanism having a converging lens is fixed to a base, and movement of the workpiece in a direction perpendicular to the optical axis of the converging lens is performed by the holding mechanism.

CITATION LIST

Patent Literature

[Patent Literature 1] Japanese Patent No. 5456510

SUMMARY OF INVENTION

Technical Problem

In the laser processing apparatus described above, a modified region may be formed along a virtual plane in an object by irradiating the object with laser light. In this case, apart of the object is peeled off with the modified region formed across the virtual plane and fractures extending from the modified region as boundaries. In such peeling-off processing, so-called multifocal laser processing in which laser light is modulated to be branched into a plurality of rays of processing light is sometimes performed. However, in the peeling-off processing in which the multifocal laser processing is performed, there is a possibility of a side of the object opposite to a laser light incidence side (for example, a functional element layer) being significantly damaged by non-modulated light of the laser light.

Therefore, an object of the present disclosure is to provide a laser processing apparatus and a laser processing method capable of curbing damage on a side of an object opposite to a laser light incidence side.

Solution to Problem

According to an aspect of the present disclosure, there is provided a laser processing apparatus that forms a modified region along a virtual plane in an object by irradiating the object with laser light, the apparatus including: a support part configured to support the object; an irradiation unit configured to irradiate the object supported by the support part with the laser light; a moving mechanism configured to move at least one of the support part and the irradiation unit; and a controller configured to control the irradiation unit and the moving mechanism, wherein the irradiation unit has a spatial light modulator that modulates the laser light and a converging part that converges the laser light modulated by the spatial light modulator on the object, wherein the controller executes first control for causing the laser light to be modulated by the spatial light modulator such that the laser light is branched into a plurality of rays of processing light and a plurality of converging points of the plurality of rays of processing light are positioned in different positions in a direction perpendicular to an irradiation direction of the laser light, and wherein, in the first control, the laser light is modulated such that fractures that extend from a plurality of modified spots constituting the modified region and stretch along the virtual plane to be connected to each other are present between a converging point of non-modulated light of the laser light and an opposite surface on a side opposite to a laser light incidence surface of the object in the irradiation direction.

In this laser processing apparatus, the laser light is branched into a plurality of rays of processing light, and the plurality of converging points of the plurality of rays of processing light are positioned in different positions in a direction perpendicular to an irradiation direction. At this time, fractures that extend from a plurality of modified spots constituting the modified region and stretch along the virtual plane to be connected to each other are present between a converging point of non-modulated light of the laser light and an opposite surface on a side opposite to a laser light incidence surface of the object. These fractures can block the non-modulated light of the laser light such that the non-modulated light does not reach a side opposite to the laser light incidence side in the object. Therefore, it is possible to prevent damage from occurring on the opposite side of the object due to the non-modulated light of the laser light. That is, it is possible to curb damage to a side opposite to the laser light incidence side in the object.

In the laser processing apparatus according to the aspect of the present disclosure, the fractures extending from the plurality of modified spots may be connected to each other to spread two-dimensionally along the virtual plane. Such fractures can effectively block the non-modulated light of the laser light.

In the laser processing apparatus according to the aspect of the present disclosure, the object may include a substrate and a functional element layer provided on a side of the substrate opposite to a laser light incidence side. In this case, since the functional element layer is provided on the opposite side of the object, the effect of curbing damage on the opposite side of the object is particularly effective.

In the laser processing apparatus according to the aspect of the present disclosure, the controller may execute second control for causing at least one of the support part and the irradiation unit to be moved by the moving mechanism such that positions of the converging points of the plurality of rays of processing light move along the virtual plane. By moving the positions of the converging points of the plurality of rays of processing light along the virtual plane in this manner, it is possible to specifically realize the formation of the modified region along the virtual plane.

In the laser processing apparatus according to the aspect of the present disclosure, in the first control, the plurality of converging points of the plurality of rays of processing light may be moved in the direction perpendicular to the irradiation direction of the laser light such that the fractures are present between the converging point of the non-modulated light of the laser light and the opposite surface in the irradiation direction. As a result, it is possible to reliably position the fractures between the converging point of the non-modulated light and the opposite surface of the laser light incidence surface in the irradiation direction of the laser light.

In the laser processing apparatus according to the aspect of the present disclosure, in the second control, at least one of the support part and the irradiation unit may be moved such that the positions of the converging points of the plurality of rays of processing light move along a processing line, and the fractures extending from the plurality of modified spots may stretch in a direction along the processing line and a direction intersecting with the processing line to be connected to each other. Such fractures can effectively block the non-modulated light of the laser light.

In the laser processing apparatus according to the aspect of the present disclosure, in the first control, the laser light may be modulated such that, in the irradiation direction, the converging point of each of the plurality of rays of processing light is positioned on a side opposite to the converging point of the non-modulated light of the laser light with respect to an ideal converging point of the processing light, or the converging point of each of the plurality of rays of processing light is positioned on a side opposite to the ideal converging point of the processing light with respect to the converging point of the non-modulated light. As a result, it is possible to keep the converging point of the non-modulated light of the laser light away from a side opposite to the laser light incidence side in the object. Therefore, it is possible to prevent damage from occurring on the opposite side of the object due to the converging of the non-modulated light of the laser light.

In the laser processing apparatus according to the aspect of the present disclosure, in the first control, the laser light may be modulated such that the modified region is present between the converging point of the non-modulated light of the laser light and the opposite surface of the object in the irradiation direction. In this case, the modified region can block the non-modulated light of the laser light such that the non-modulated light does not reach a side opposite to the laser light incidence side in the object. Therefore, it is possible to prevent damage from occurring on the opposite side of the object due to the non-modulated light of the laser light.

According to another aspect of the present disclosure, there is provided a laser processing method in which a modified region is formed along a virtual plane in an object by irradiating the object with laser light, the method including: a step of branching the laser light into a plurality of rays of processing light and positioning a plurality of converging points of the plurality of rays of processing light in different positions in a direction perpendicular to an irradiation direction of the laser light, and wherein, in the step, fractures that extend from a plurality of modified spots constituting the modified region and stretch along the virtual plane to be connected to each other are caused to be present between a converging point of non-modulated light of the laser light and an opposite surface on a side opposite to a laser light incidence surface of the object in the irradiation direction.

In this laser processing method, as in the above laser processing apparatus, the fractures present between the converging point of the non-modulated light and the opposite surface can block the non-modulated light of the laser light such that the non-modulated light does not reach the opposite side of the object. Therefore, it is possible to prevent damage from occurring on the opposite side of the object due to the non-modulated light of the laser light. That is, it is possible to curb damage to a side opposite to the laser light incidence side in the object.

Advantageous Effects of Invention

According to the present disclosure, it is possible to provide a laser processing apparatus and a laser processing method capable of curbing damage on a side of an object opposite to a laser light incidence side.

BRIEF DESCRIPTION OF DRAWINGS

FIG. 3(*b*) is a cross-sectional view of the object.

FIG. 7 is a diagram showing a result of an evaluation test for evaluating peeling-off processing of the first embodiment.

FIG. 8 is a diagram showing a display example of an input reception unit of the first embodiment.

FIG. 16 is a diagram showing a result of an evaluation test for evaluating peeling-off processing according to the third embodiment.

DESCRIPTION OF EMBODIMENTS

Figure 1:
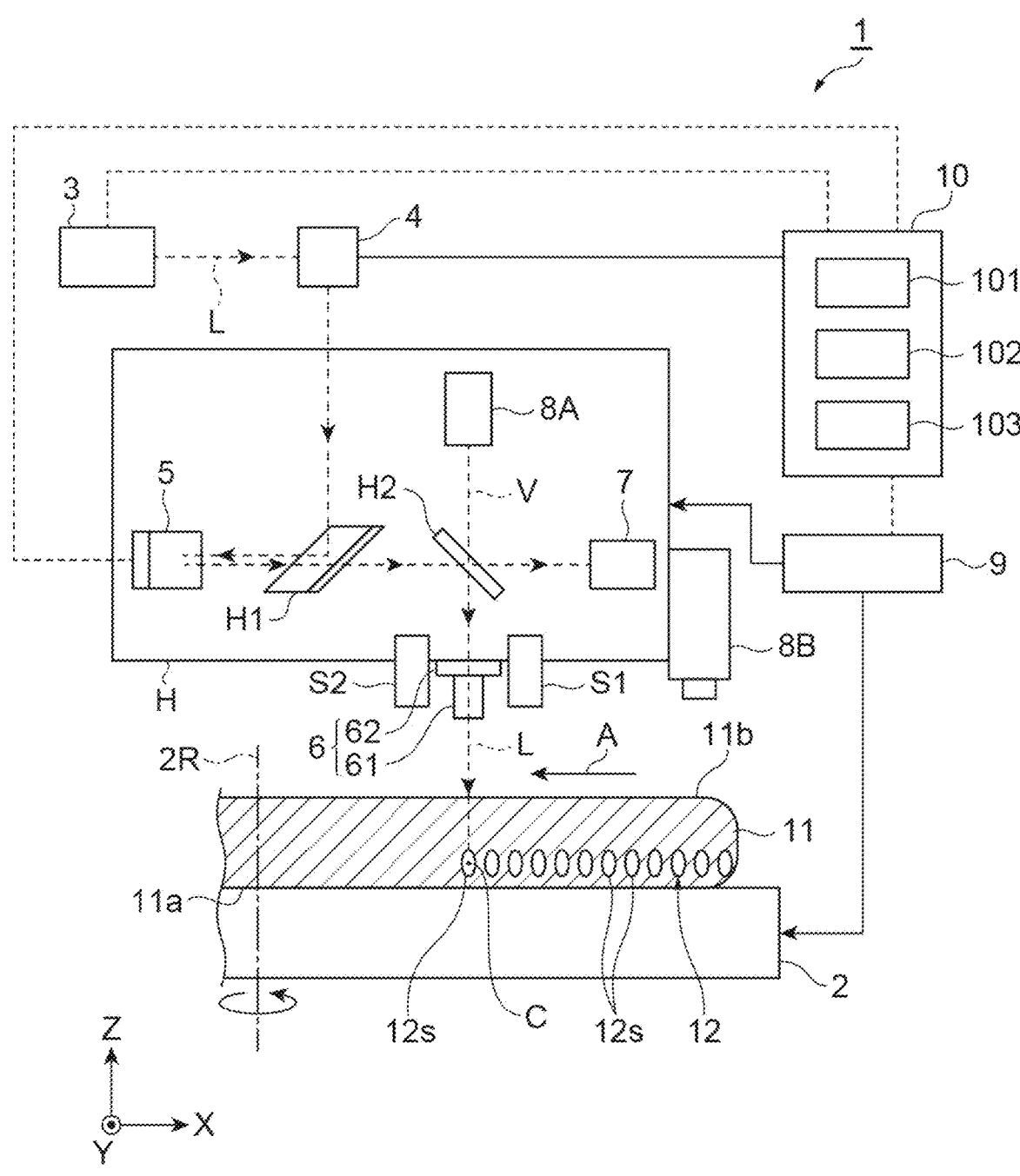
FIG. 1 is a configuration diagram of a laser processing apparatus of a first embodiment.

Hereinafter, embodiments will be described in detail with reference to the drawings. The same or corresponding parts in the drawings are denoted with the same reference signs, and repetitive description will be omitted.

[First embodiment] A first embodiment will be described. As illustrated in FIG. 1, a laser processing apparatus 1 includes a support part 2, a light source 3, an optical axis adjusting part 4, a spatial light modulator 5, a converging part 6, an optical axis monitoring part 7, a visible image capturing part 8A, an infrared image capturing part 8B, a moving mechanism 9, and a controller 10. The laser processing apparatus 1 is a device that forms a modified region 12 in an object 11 by irradiating the object 11 with laser light L. In the following description, three directions orthogonal to each other are referred to as an X direction, a Y direction, and a Z direction. In the present embodiment, the X direction is a first horizontal direction, the Y direction is a second horizontal direction perpendicular to the first horizontal direction, and the Z direction is a vertical direction.

The support part 2 supports the object 11 by adsorbing a film (not shown) attached to the object 11 such that a front surface 11*a* and a back surface 11*b* of the object 11 are orthogonal to the Z direction, for example. The support part 2 can move in each of the X direction and the Y direction. In the support portion 2 of the present embodiment, the object 11 is placed in a state in which the back surface 11*b* of the object 11 is an upper side which is a side of a laser light incidence surface (a state in which the front surface 11*a* is a lower side which is a side of the support part 2). The support part 2 has a rotation axis 2R extending in the Z direction. The support part 2 is rotatable around the rotation axis 2R.

The light source 3 emits the laser light L by, for example, a pulse oscillation method. The laser light L has transmittance with respect to the object 11. The optical axis adjusting part 4 adjusts an optical axis of the laser light L emitted from the light source 3. In the present embodiment, the optical axis adjusting part 4 adjusts the optical axis of the laser light L emitted from the light source 3 while changing the traveling direction of the laser light L to the Z direction. The optical axis adjusting part 4 is constituted by, for example, a plurality of reflection mirrors of which positions and angles can be adjusted.

The spatial light modulator 5 is disposed in a laser processing head H. The spatial light modulator 5 modulates the laser light L emitted from the light source 3. In the present embodiment, the laser light L traveling downward in the Z direction from the optical axis adjusting part 4 enters the laser processing head H. The laser light L entering the laser processing head H is horizontally reflected by a mirror H1 to form an angle with respect to the Y direction. The laser light L reflected by the mirror H1 enters the spatial light modulator 5. The spatial light modulator 5 modulates the laser light L entering in this manner while horizontally reflecting the laser light L in the Y direction.

The converging part 6 is attached to a bottom wall of the laser processing head H. The converging part 6 converges the laser light L modulated by the spatial light modulator 5 to the object 11 supported by the support part 2. In the present embodiment, the laser light L which has been horizontally reflected in the Y direction by the spatial light modulator 5 is reflected downward in the Z direction by a dichroic mirror H2. Then, the laser light L reflected by the dichroic mirror H2 enters the converging part 6. The converging part 6 converges the laser light L entering in this manner to the object 11. The converging part 6 is configured by attaching a converging lens unit 61 to the bottom wall of the laser processing head H via a drive mechanism 62. The drive mechanism 62 moves the converging lens unit 61 in the Z direction by, for example, a driving force of a piezoelectric element.

In the laser processing head H, an imaging optical system (not shown) is disposed between the spatial light modulator 5 and the converging part 6. The imaging optical system constitutes a double-sided telecentric optical system in which a reflecting surface of the spatial light modulator 5 and an entrance pupil surface of the converging part 6 are in an imaging relation. Thus, an image of the laser light L on the reflecting surface of the spatial light modulator 5 (an image of the laser light L modulated by the spatial light modulator 5) is transferred to (formed on) the entrance pupil surface of the converging part 6. A pair of distance measuring sensors S1 and S2 are attached to the bottom wall of the laser processing head H to be positioned on both sides of the converging lens unit 61 in the X direction. Each of the distance measuring sensors S1 and S2 acquires displacement data of the back surface 11*b* of the object 11 by emitting distance measurement light (for example, laser light) to the back surface 11*b* and detecting the distance measurement light reflected by the back surface 11*b*. The laser processing head H constitutes an irradiation unit.

The optical axis monitoring part 7 is disposed in the laser processing head H. The optical axis monitoring part 7 detects some of the laser light L transmitted through the dichroic mirror H2. A detection result of the optical axis monitoring part 7 indicates, for example, a relation between the optical axis of the laser light L entering the converging lens unit 61 and an optical axis of the converging lens unit 61. The visible image capturing part 8A is disposed in the laser processing head H. The visible image capturing part 8A emits visible light V and acquires an image of the object 11 formed with the visible light V as an image. In the present embodiment, the visible light V emitted from the visible image capturing part 8A is applied onto the back surface 11*b* of the object 11 via the dichroic mirror H2 and the converging part 6. Then, the visible light V reflected by the back surface 11*b* is detected by the visible image capturing part 8A via the converging part 6 and the dichroic mirror H2. The infrared image capturing part 8B is attached to a side wall of the laser processing head H. The infrared image capturing part 8B emits infrared light and acquires an image of the object 11 formed with the infrared light as an infrared image.

The moving mechanism 9 includes a mechanism for moving the laser processing head H in the X direction, the Y direction, and the Z direction. The moving mechanism 9 drives the laser processing head H by a driving force of a known driving device such as a motor such that a converging point C of the laser light L moves in the X direction, the Y direction, and the Z direction. Further, the moving mechanism 9 includes a mechanism that rotates the support part 2 around the rotation axis 2R. The moving mechanism 9 rotates the support part 2 by a driving force of a known driving device such as a motor such that the converging point C of the laser light L moves in a $\theta$ direction around the rotation axis 2R.

The controller 10 controls an operation of each part in the laser processing apparatus 1. The controller 10 controls at least the spatial light modulator 5 and the moving mechanism 9. The controller 10 includes a processing unit 101, a storage part 102, and an input reception unit 103. The processing unit 101 is configured as a computer device including a processor, a memory, a storage, a communication device, and the like. In the processing unit 101, the processor executes software (a program) read from the memory or the like and controls reading and writing of data in the memory and the storage, and communication of a communication device.

The storage part 102 is, for example, a hard disk or the like, and stores various types of data. The input reception unit 103 is an interface that receives an input of various types of data from an operator. In the present embodiment, the input reception unit 103 constitutes a graphical user interface (GUI). The input reception unit 103 receives inputs of a slicing position and a Z-direction shift amount, as will be described later.

In the laser processing apparatus 1 configured as described above, if the laser light L is converged in the object 11, the laser light L is absorbed at a portion corresponding to the converging point C of the laser light L, and thus the modified region 12 is formed in the object 11. The modified region 12 is a region in which a density, a refractive index, a mechanical strength, and other physical properties are different from those of a surrounding non-modified region. Examples of the modified region 12 include a melting treatment region, a crack region, a dielectric breakdown region, a refractive index change region, and the like. The modified region 12 includes a plurality of modified spots 12s and fractures extending from the plurality of modified spots 12s.

Figure 2:
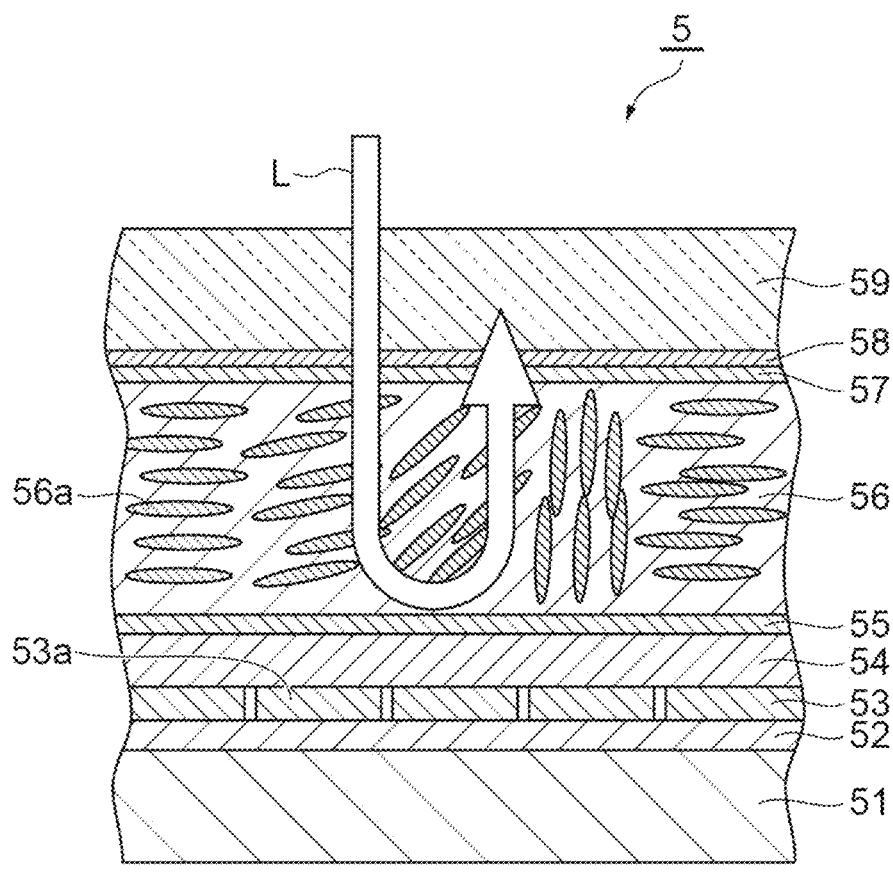
FIG. 2 is a cross-sectional view of a portion of a spatial light modulator illustrated in FIG. 1.

The spatial light modulator 5 will be specifically described. The spatial light modulator 5 is a spatial light modulator (SLM) having a reflective liquid crystal (liquid crystal on silicon (LCOS)). As shown in FIG. 2, the spatial light modulator 5 is configured by stacking a drive circuit layer 52, a pixel electrode layer 53, a reflective film 54, an alignment film 55, a liquid crystal layer 56, an alignment film 57, a transparent conductive film 58, and a transparent substrate 59 on a semiconductor substrate 51 in that order.

The semiconductor substrate 51 is, for example, a silicon substrate. The drive circuit layer 52 constitutes an active matrix circuit on the semiconductor substrate 51. The pixel electrode layer 53 includes a plurality of pixel electrodes 53a arranged in a matrix along a surface of the semiconductor substrate 51. Each of the pixel electrodes 53a is formed of, for example, a metal material such as aluminum. A voltage is applied to each of the pixel electrodes 53a by the drive circuit layer 52.

The reflective film 54 is, for example, a dielectric multi-layer film. The alignment film 55 is provided on a surface of the liquid crystal layer 56 on a side of the reflective film 54. The alignment film 57 is provided on a surface of the liquid crystal layer 56 on a side opposite to the reflective film 54. Each of the alignment films 55 and 57 is formed of, for example, a polymer material such as polyimide. For example, a rubbing treatment is performed on a contact surface of each of the alignment films 55 and 57 with the liquid crystal layer 56. The alignment films 55 and 57 align liquid crystal molecules 56a contained in the liquid crystal layer 56 in a predetermined direction.

The transparent conductive film 58 is provided on a surface of the transparent substrate 59 on a side of the alignment film 57 and faces the pixel electrode layer 53 with the liquid crystal layer 56 and the like interposed therebetween. The transparent substrate 59 is, for example, a glass substrate. The transparent conductive film 58 is formed of, for example, a light transmissive and conductive material such as ITO. The transparent substrate 59 and the transparent conductive film 58 transmit the laser light L.

In the spatial light modulator 5 configured as described above, when a signal indicating a modulation pattern is input from the controller 10 to the drive circuit layer 52, a voltage corresponding to the signal is applied to each of the pixel electrodes 53a. Thus, an electric field is formed between each of the pixel electrodes 53a and the transparent conductive film 58. When the electric field is formed, in the liquid crystal layer 56, an alignment direction of the liquid crystal molecules 56a changes for each region corresponding to each of the pixel electrodes 53a, and a refractive index changes for each region corresponding to each of the pixel electrodes 53a. This state is a state in which the modulation pattern is displayed on the liquid crystal layer 56.

In a state where the modulation pattern is displayed on the liquid crystal layer 56, when the laser light L enters the liquid crystal layer 56 from the outside via the transparent substrate 59 and the transparent conductive film 58, is reflected by the reflective film 54, and then is emitted to the outside from the liquid crystal layer 56 via the transparent conductive film 58 and the transparent substrate 59, the laser light L is modulated in accordance with the modulation pattern displayed on the liquid crystal layer 56. As described above, according to the spatial light modulator 5, it is possible to perform the modulation of the laser light L (for example, the modulation of an intensity, an amplitude, a phase, a polarization, and the like of the laser light L) by appropriately setting the modulation pattern to be displayed on the liquid crystal layer 56.

Figure 3:
FIG. 3(*a*) is a plan view of an object.

A configuration of the object 11 will be specifically described. The object 11 of the present embodiment is a disk-shaped wafer, as shown in FIGS. 3(a) and 3(b). The object 11 has the front surface (a first surface) 11a and the back surface (a second surface) 11b on a side opposite to the front surface 11a. The object 11 includes a substrate 21 and a device layer (a functional element layer) 22 provided on a side of the substrate 21 opposite to a side of a laser light incidence surface. The object 11 is configured by stacking the device layer 22 on the substrate 21.

The substrate 21 is, for example, a semiconductor substrate such as a silicon substrate. The substrate 21 may be provided with a notch or an orientation flat that indicates a crystal orientation. The device layer 22 is provided on a side of the front surface 11a in the object 11. The device layer 22 includes a plurality of functional elements arranged in a matrix along a main surface of the substrate 21. The device layer 22 includes a metal layer such as a titanium (Ti) layer and a tin (Sn) layer deposited on the substrate 21. Each of the functional elements is, for example, a light receiving element such as a photodiode, a light emitting element such as a laser diode, a circuit element such as a memory, or the like. Each of the functional elements may be configured three-dimensionally by stacking a plurality of layers.

A virtual plane M1 is set in the object 11 as a plane to be peeled off. The virtual plane M1 is a plane along which the modified region 12 is to be formed. The virtual plane M1 is a plane facing the back surface 11b, which is the laser light incidence surface, of the object 11. The virtual plane M1 is a plane parallel to the back surface 11b and has, for example, a circular shape. The virtual plane M1 is a virtual region, is not limited to a flat shape, and may be in a curved shape or a three-dimensional shape.

A processing line 15 is set in the object 11. The processing line 15 is a line along which the modified region 12 is to be formed. The processing line 15 extends spirally inward from a peripheral side of the object 11. In other words, the processing line 15 extends in a spiral shape (an involute curve) around a position of the rotation axis 2R (see FIG. 1) of the support part 2. The processing line 15 is a virtual line, but may be an actually drawn line. The setting of the virtual plane M1 and the processing line 15 can be performed in the controller 10. The virtual plane M1 and the processing line 15 may be coordinate-designated. Only one of the virtual plane M1 and the processing line 15 may be set.

The laser processing apparatus 1 of the present embodiment forms the modified region 12 along the virtual plane M1 in the object 11 by irradiating the object 11 with the laser light L in accordance with the converging point (at least a part of a converging region) C. The laser processing apparatus 1 subjects the object 11 to laser processing including peeling-off processing to acquire (manufacture) a semiconductor device. The peeling-off processing is processing for peeling off a part of the object 11.

The controller 10 executes multifocal processing control (first control) for causing the laser light L to be modulated by the spatial light modulator 5 such that the laser light L is branched into a plurality of rays of processing light and a plurality of converging points of the plurality of rays of processing light are positioned in different positions in a direction perpendicular to an irradiation direction of the laser light L. For example, in the multifocal processing control, the spatial light modulator 5 is controlled, and a predetermined modulation pattern (a modulation pattern including a diffraction pattern, or the like) is displayed on the liquid crystal layer 56 of the spatial light modulator 5. In this state, the laser light L is emitted from the light source 3, and the laser light L is converged on the object 11 from a side of the back surface 11b by the converging part 6. That is, the laser light L is modulated by the spatial light modulator 5, and the modulated laser light L is converged on the object 11 by the converging part 6 with the back surface 11b as the laser light incidence surface. As a result, the laser light L is branched (diffracted) into two rays of processing light L1 and L2, and converging points C1 and C2 of the two rays of processing light L1 and L2 are positioned at positions different from each other in the X direction and/or the Y direction.

Figure 4:
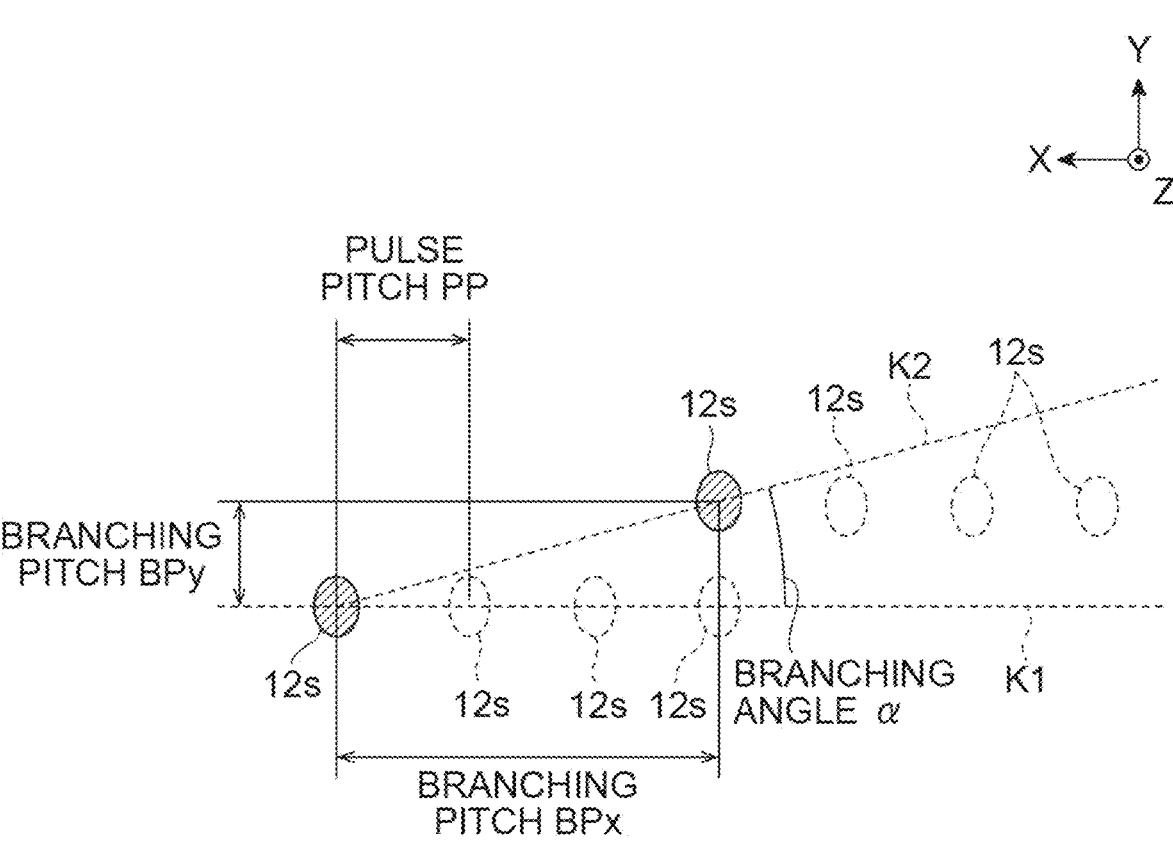
FIG. 4 is a schematic diagram explaining branching of laser light.

In an example shown in FIG. 4, the laser light L is branched into two rays of processing light L1 and L2 such that two modified spots 12s aligned in a row in an inclination direction K2 inclined with respect to a processing progress direction K1 (an extending direction of the processing line 15) are formed on the virtual plane M1. The processing light L1 is −1st-order light, and the processing light is +1st-order light. In the plurality of modified spots 12s formed at the same time, an interval in the X direction is a branch pitch BPx, and an interval in the Y direction is a branch pitch BPy. In a pair of modified spots 12s formed by emission of the laser light L of two continuous pulses, an interval in the processing progress direction K1 is a pulse pitch PP. An angle between the processing progress direction K1 and the inclination direction K2 is a branching angle $\alpha$.

Figure 5:
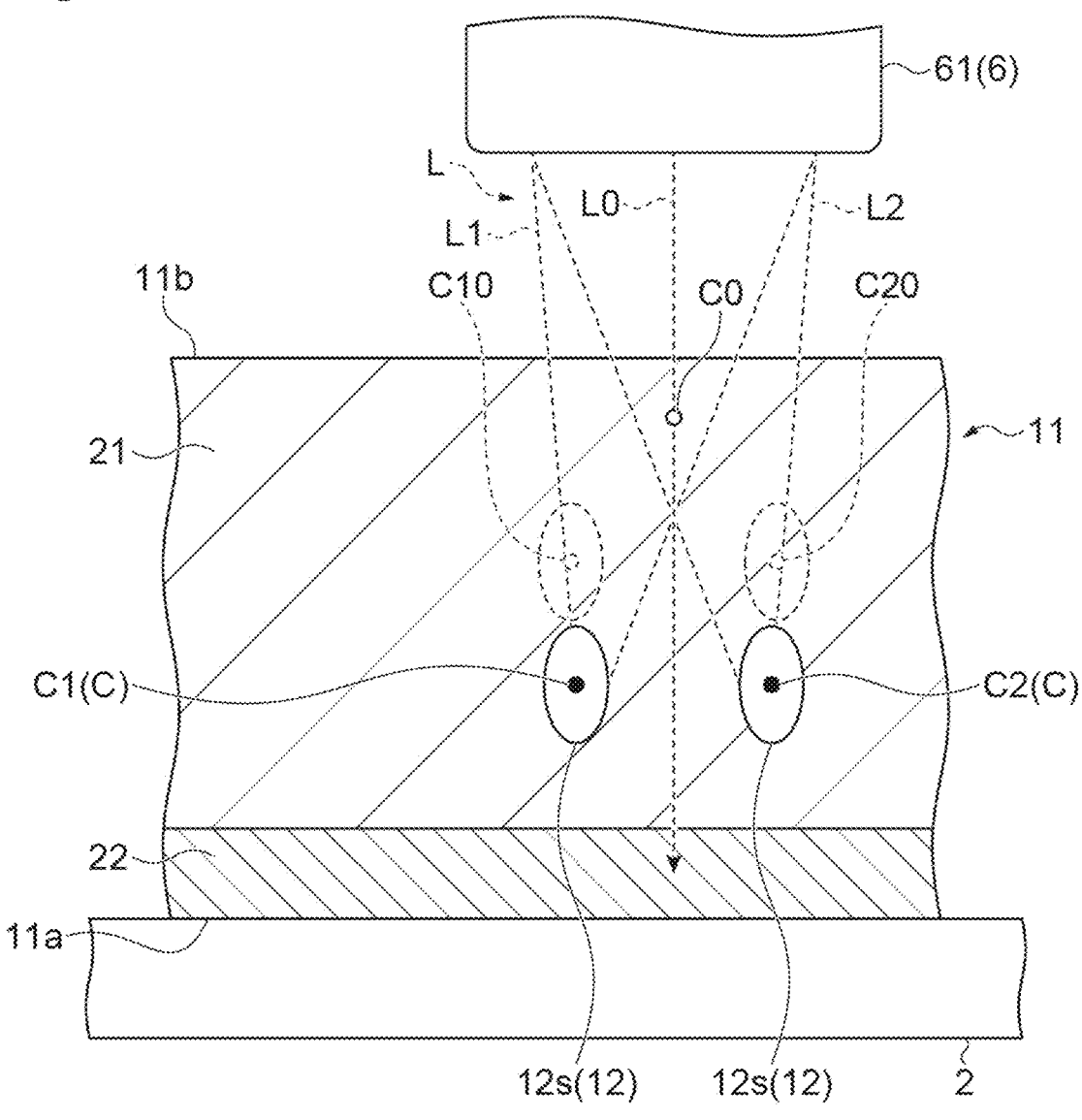
FIG. 5 is a side cross-sectional view of the object for explaining multifocal processing control according to the first embodiment.

As shown in FIG. 5, in the multifocal processing control, the laser light L is modulated such that the converging points C1 and C2 of the plurality of rays of processing light L1 and L2 are positioned on a side opposite to a converging point C0 of non-modulated light L0 of the laser light L with respect to ideal converging points C10 and C20 of the rays of processing light L1 and L2 in the Z direction. Specifically, in the multifocal processing control, the laser light L is modulated by the spatial light modulator 5 such that the converging points C1 and C2 of the plurality of rays of processing light L1 and L2 are positioned on a side of the device layer 22 by a Z-direction shift amount with respect to the ideal converging points C10 and C20 in the Z direction.

The ideal converging point of the processing light is a converging point in a case where it is assumed that there is no spherical aberration and the processing light is converged at one point in the object 11. The non-modulated light L0 of the laser light L is light emitted from the spatial light modulator 5 without being modulated by the spatial light modulator 5 among rays of the laser light L entering the spatial light modulator 5. For example, light reflected on an outer surface of the transparent substrate 59 (a surface on a side opposite to the transparent conductive film 58) among rays of the laser light L entering the spatial light modulator 5 becomes the non-modulated light L0. The converging point C0 of the non-modulated light L0 corresponds to a focal position of the converging lens unit 61. When the non-modulated light L0 is in the object 11, or when the non-modulated light L0 passes through the object 11 and is positioned on a side opposite to an incidence side (see FIG. 9), the converging region stretches in the Z direction due to the influence of spherical aberration and the like. In this converging region, a point that affects damage most and has the highest intensity is defined as the converging point C0.

In the multifocal processing control, the laser light L is modulated by the spatial light modulator 5 such that the converging point C0 of the non-modulated light L0 is positioned on a laser light incidence side (a side of the back surface 11b) in the object 11 in the Z direction. In the multifocal processing control, the converging points C1 and C2 of the plurality of rays of processing light L1 and L2 are shifted from the ideal converging points C10 and C20 of the rays of processing light L1 and L2 to the positions along the virtual plane M1, based on a slicing position and a Z-direction shift amount received by the input reception unit 103. Such a shift of the converging points C1 and C2 of the rays of processing light L1 and L2 can be realized by appropriately controlling the modulation pattern displayed on the liquid crystal layer 56 of the spatial light modulator 5.

The controller 10 executes movement control (second control) for causing at least one of the support part 2 and the laser processing head H to be moved by the moving mechanism 9 such that the positions of the converging points C1 and C2 of the plurality of rays of processing light L1 and L2 move along the virtual plane M1 along with the emission of the laser light L from the laser processing head H. In the movement control, at least one of the support part 2 and the laser processing head H is moved such that the positions of the converging points C1 and C2 of the plurality of rays of processing light L1 and L2 move along the processing line 15. In the movement control, the movement of the laser processing head H (the converging points C1 and C2) in the X direction is controlled while the support part 2 is rotated.

The control unit 10 can execute various types of control on the basis of rotation information (hereinafter also referred to as "$\theta$ information") regarding the amount of rotation of the support part 2. The $\theta$ information may be acquired from the driving amount of the moving mechanism 9 that rotates the support part 2, or may be acquired by a separate sensor or the like. The $\theta$ information can be acquired by various known techniques. The controller 10 controls display of the input reception unit 103. The controller 10 executes the peeling-off processing on the basis of various types of setting input from the input reception unit 103.

Next, a laser processing method using the laser processing apparatus 1 will be described. Here, an example of performing the peeling-off processing on the object 11 using the laser processing apparatus 1 will be described.

First, the object 11 is placed on the support part 2 with the back surface 11b as a side of the laser light incidence surface. A side of the front surface 11a of the object 11 on which the device layer 22 is mounted is protected by a support substrate or a tape material adhering thereto. Subsequently, height setting is performed by moving the laser processing head H (that is, the converging part 6) in the Z direction on the basis of the image (for example, the image of the back surface 11b of the object 11) acquired by the visible image capturing part 8A, such that the converging point C of the laser light L is positioned on the back surface 11b. The laser processing head H is moved in the Z direction with the position of the height setting as a reference, such that the converging point C of the laser light L is positioned at a predetermined depth from the back surface 11b.

Hereinafter, the position of the converging part 6 after the laser processing head H is moved from the position of the height setting in the Z direction in this way is referred to as a "defocus position." Here, the defocus position is a parameter that becomes negative (a negative side) as the converging part 6 approaches the object 11 with the height setting as a reference (the defocus position=0). The predetermined depth is a depth at which the modified region 12 can be formed along the virtual plane M1 of the object 11.

Subsequently, while the support part 2 is rotated at a constant rotational speed, the laser light L is emitted from the light source 3, and the laser processing head H is moved in the X direction such that the converging point C is moved inward from an outer edge side of the virtual plane M1 in the X direction. As a result, the modified region 12 extending in a spiral shape around the position of the rotation axis 2R (see FIG. 1) is formed along the processing line 15 on the virtual plane M1 in the object 11.

In the formation of the modified region 12, the multifocal processing control is executed, the laser light L is branched into the plurality of rays of processing light L1 and L2, and the converging points C1 and C2 of the plurality of rays of processing light L1 and L2 are positioned at positions different from each other in the X direction and/or the Y direction. Along with this, the positions of the converging points C1 and C2 of the plurality of rays of processing light L1 and L2 are relatively moved along the virtual plane M1. As a result, the plurality of modified spots 12s are formed along the virtual plane M1. At this time, the drive mechanism 62 of the converging part 6 is operated on the basis of the displacement data of the back surface 11b acquired by the distance measuring sensor positioned on the front side in the processing progress direction K1 among the pair of distance measuring sensors S1 and S2, such that the converging point C of the laser light L follows the back surface 11b.

The formed modified region 12 includes the plurality of modified spots 12s. One modified spot 12s is formed by the emission of the laser light L of one pulse. The modified region 12 is a set of the plurality of modified spots 12s. Adjacent modified spots 12s may be connected to each other or separated from each other, depending on a pulse pitch PP of the laser light L (a value obtained by dividing a relative movement speed of the converging point C with respect to the object 11 by a repetition frequency of the laser light L).

Subsequently, a part of the object 11 is peeled off with the modified region 12 formed across the virtual plane M1 and the fractures extending from the modified spots 12s of the modified region 12 as boundaries. The peeling-off of the object 11 may be performed using, for example, an adsorbing jig. The peeling-off of the object 11 may be performed on the support part 2, or may be performed by moving it to an area dedicated to the peeling-off. The object 11 may be peeled off using air blow or a tape material. If the object 11 cannot be peeled off only by an external stress, the modified region 12 may be selectively etched with an etchant (KOH, TMAH, or the like) that reacts with the object 11. As a result, it is possible to easily peel off the object 11.

Although the support part 2 is rotated at a constant rotational speed, the rotational speed may be changed. For example, the rotational speed of the support part 2 may be changed such that the pulse pitch PP of the modified spots 12s becomes a constant interval. The peeled-off surface of the object 11 may be subjected to finish grinding or polishing with an abrasive such as a whetstone. In a case where the object 11 is peeled off by etching, the polishing may be simplified.

Figure 6:
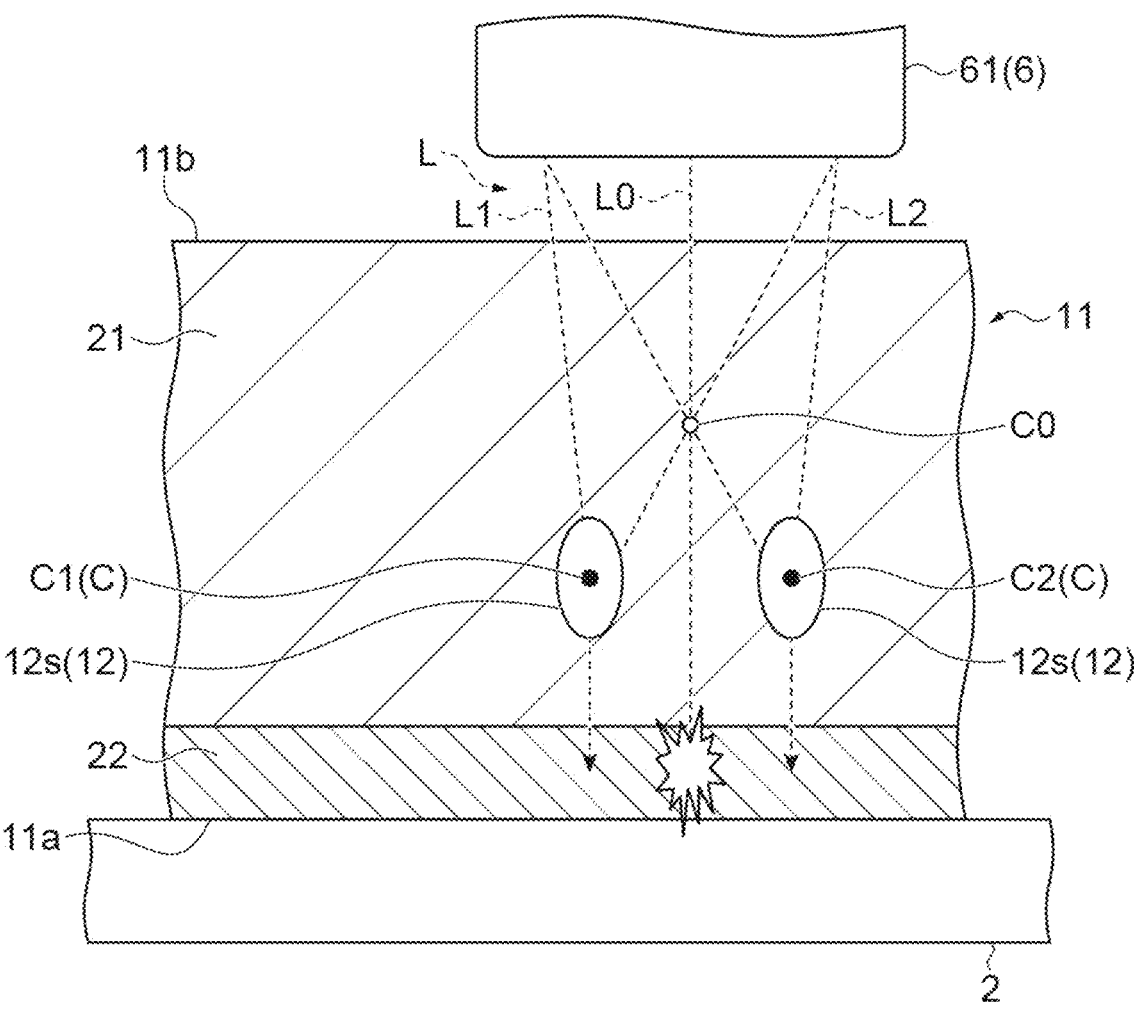
FIG. 6 is a side cross-sectional view of the object for explaining general multifocal processing control.

Incidentally, in the general multifocal processing control of the related art, the converging points C1 and C2 of the plurality of rays of processing light L1 and L2 coincide with the ideal converging points C10 and C20 thereof, as shown in FIG. 6. In this case, there is a concern that the device layer 22 may be damaged by the influence of leakage light (light not absorbed by the object 11) of the non-modulated light L0 of the laser light L. In particular, in the peeling-off processing, such a problem may become conspicuous. This is because, in the peeling-off processing, an active area of the device layer 22 is also irradiated with the laser light L, and thus the leakage light of the non-modulated light L0 is likely to lead to damage directly below the device layer 22, which is likely to lead to deterioration of the device characteristics.

In this respect, according to the multifocal processing control of the present embodiment, the converging points C1 and C2 of the plurality of rays of processing light L1 and L2 are positioned on a side opposite to the converging point C0 of the non-modulated light L0 of the laser light L with respect to the ideal converging points C10 and C20 of the rays of processing light L1 and L2 in the Z direction. Specifically, the converging points C1 and C2 of the plurality of rays of processing light L1 and L2 are positioned at the positions close to the device layer 22 by the Z-direction shift amount with respect to the ideal converging points C10 and C20. The defocus position is positioned on a side away from the device layer 22 by the Z-direction shift amount as compared with a case where the ideal converging points C10 and C20 are positioned along the virtual plane M1 (see Comparative Example which will be described later). The converging point C0 of the non-modulated light L0 is positioned on a side away from the device layer 22 by the Z-direction shift amount as compared with a case where the ideal converging points C10 and C20 are positioned along the virtual plane M1.

Therefore, according to the laser processing apparatus 1 and the laser processing method, it is possible to keep the converging point C0 of the non-modulated light L0 of the laser light L away from the device layer 22 in the object 11 as a result. It is possible to curb an energy density of the leakage light reaching the device layer 22. It is possible to reduce the adverse effects on the device layer 22 due to the converging of the non-modulated light L0. It is possible to prevent damage from occurring in the device layer 22 of the object 11 due to the converging of the non-modulated light L0. That is, it is possible to curb damage to the device layer 22 (a side opposite to the laser light incidence side) in the object 11.

In the multifocal processing control of the laser processing apparatus 1, the laser light L is modulated by the spatial light modulator 5 such that the converging point C0 of the non-modulated light L0 is positioned on the laser light incidence side (a side of the back surface 11b) in the object 11 in the Z direction. In other words, in laser processing method, the converging point C0 of the non-modulated light L0 is positioned on the laser light incidence side in the object 11 in the Z direction. As a result, it is possible to effectively keep the converging point C0 of the non-modulated light L0 away from the device layer 22 lay of the object 11.

In the laser processing apparatus 1 and laser processing method, the object 11 includes the substrate 21 and the device layers 22. Since the device layer 22 is provided on a side opposite to the laser light incidence side of the object 11, an effect of curbing damage to the device layer 22 in the object 11 is exhibited as an effect of curbing damage on a side opposite to the laser light incidence side of the object 11. This effect is particularly effective.

In the laser processing apparatus 1 and the laser processing method, at least one of the support part 2 and the laser processing head H is moved by the moving mechanism 9 such that the positions of the converging points C1 and C2 of the plurality of rays of processing light L1 and L2 move along the virtual plane M1. By moving the positions of the converging points C1 and C2 of the plurality of rays of processing light L1 and L2 along the virtual plane M1 in this manner, it is possible to specifically realize the formation of the modified region 12 along the virtual plane M1.

In the multifocal processing control of the laser processing apparatus 1, the laser light L may be modulated by the spatial light modulator 5 such that the converging point C0 of the non-modulated light L0 is positioned outside the object 11 and on a side closer to the converging part 6 than to the object 11 in the Z direction. In other words, in the laser processing method, the converging point C0 of the non-modulated light L0 may be positioned outside the object 11 and on a side closer to the converging part 6 than to the object 11 in the Z direction. As a result, it is possible to effectively keep the converging point C0 of the non-modulated light L0 away from the device layer 22 of the object 11.

FIG. 7 is a diagram showing a result of an evaluation test for evaluating the peeling-off processing according to the first embodiment. In the figure, a comparative example is an example of peeling-off processing according to the general multifocal processing control shown in FIG. 6, for example. Example 1 is an example of peeling-off processing according to the multifocal processing control of the first embodiment described above. The Z-direction shift amount indicates an absolute value. The damage evaluation photograph is a photographic view of the object 11 (the device layer 22) after laser processing, from the front surface 11a. As common processing conditions, a branch pitch BPx is 100 μm, a branch pitch BPy is 60 μm, an output of the laser light L is 3.7 W, pulse energy (a converted value assuming 20% loss in branching) is 18.5 μJ, and a pulse pitch PP is 6.25 μm, a frequency is 80 kHz, and a pulse width is 700 ns. The object 11 is a wafer having a plane orientation of [100] on the front surface 11a and the back surface 11b. In the photographic view in the figure, the object 11 is scanned with the laser light L along the processing line extending in a left-right direction.

As shown in FIG. 7, in the comparative example, the damage caused by the leakage light of the non-modulated light L0 intermittently appears in the device layer 22 along the processing line (see a dotted line in the figure). On the other hand, in Example 1, it is understood that avoidance of the damage can be realized. It is also found that it is difficult to avoid the damage when the Z-direction shift amount is 5 μm, 10 μm, and 15 μm.

FIG. 8 is a diagram showing a display example of the input reception unit 103. As shown in FIG. 8, the input reception unit 103 receives an input of various types of data from an operator. In the figure, "SS1" indicates the processing light L1, and "SS2" indicates the processing light L2. The operator can input the "number of branches" and a "shift direction", numerical values related to the rays of processing light L1 and L2, and the like via the input reception unit 103.

In the example shown in FIG. 8, "2" is input as the "number of branches", and the "Z direction" is input as the "shift direction." That is, in a state where the laser light L is branched into two rays of processing light L1 and L2, the laser processing method of the Z-direction shift is selected. The laser processing method of the Z-direction shift is a laser processing method in which the converging points C1 and C2 of the plurality of rays of processing light L1 and L2 are positioned at the positions close to the device layer 22 by the Z-direction shift amount with respect to the ideal converging points C10 and C20, as described above.

The slicing position indicates the position of the virtual plane M1 in the object 11 (a distance from the back surface 11b). The slicing position corresponds to first data. The Z-direction shift amount indicates a distance between the converging points C1 and C2 of the rays of processing light L1 and L2 and the ideal converging points C10 and C20. The Z-direction shift amount corresponds to second data. "Reference" input as "spherical aberration" indicates a correction amount of the spherical aberration of each of the rays of the processing light L1, L2, and L3. In the input reception unit 103, the input may be limited such that the Z-direction shift amount is equal to or greater than a certain value.

As described above, in the laser processing apparatus 1, the converging points C1 and C2 of the plurality of rays of processing light L1 and L2 can be shifted from the ideal converging points C10 and C20, based on various types of data including the slicing position and the Z-direction shift amount received by the input reception unit 103. In this case, the operator can set at least the slicing position and the Z-direction shift amount as desired.

Figure 9:
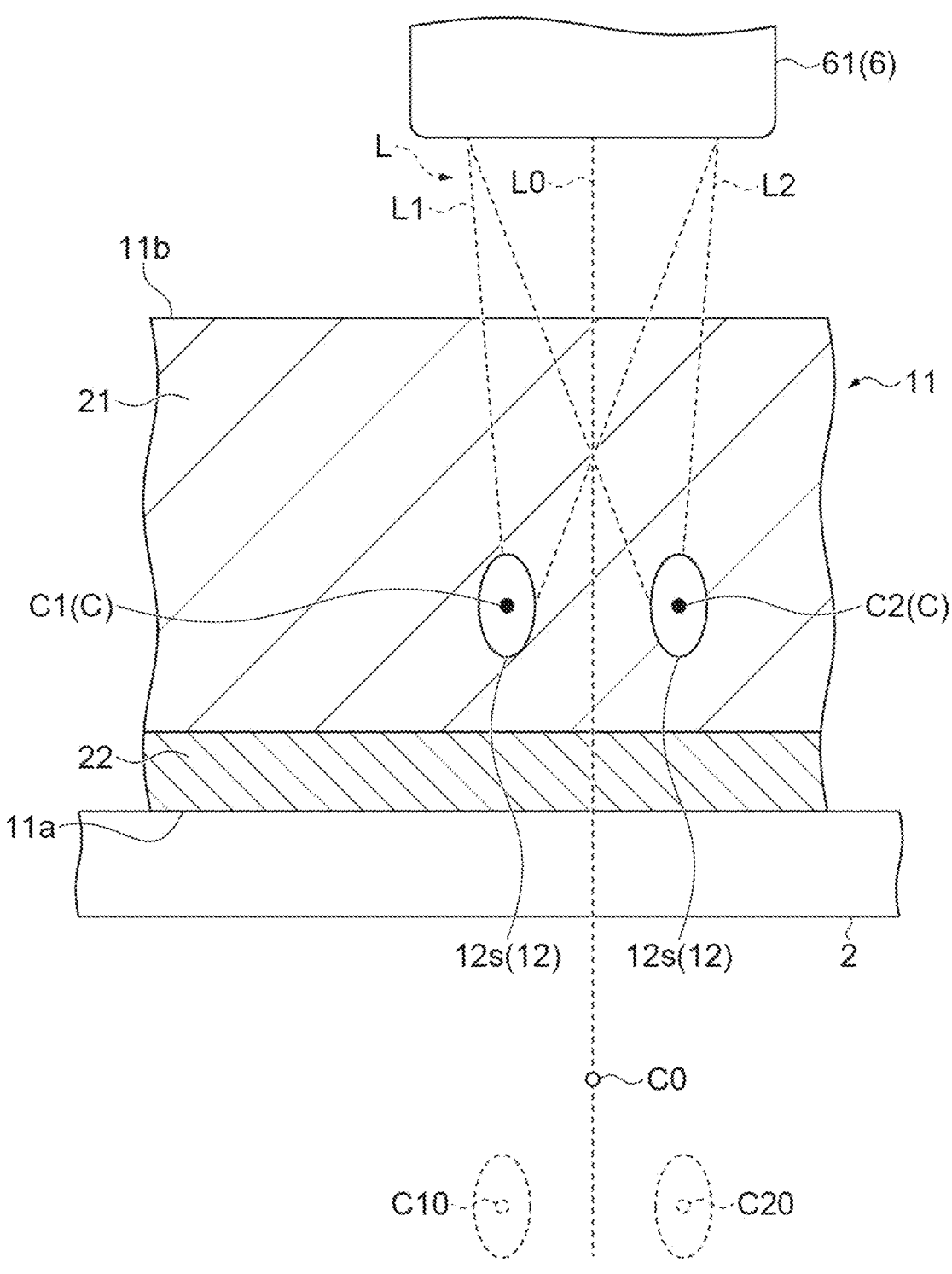
FIG. 9 is a side cross-sectional view of the object for explaining multifocal processing control according to a modification example of the first embodiment.

FIG. 9 is a side cross-sectional view of the object 11 for explaining multifocal processing control according to a modification example of the first embodiment. As shown in FIG. 9, in the multifocal processing control, the laser light L may be modulated such that the converging points C1 and C2 of the plurality of rays of processing light L1 and L2 are positioned on a side opposite to the ideal converging points C10 and C20 of the rays of processing light L1 and L2 with respect to the converging point C0 of the non-modulated light L0 in the Z direction. In the multifocal processing control according to such a modification example, the laser light L is modulated by the spatial light modulator 5 such that the converging points C1 and C2 of the plurality of rays of processing light L1 and L2 are positioned on a side close to the converging part 6 by the Z-direction shift amount with respect to the ideal converging points C10 and C20 in the Z direction.

As a result, also in this modification example, it is possible to keep the converging point C0 of the non-modulated light L0 away from the device layer 22 in the object 11. It is possible to curb the energy density of the leakage light of the non-modulated light L0 reaching the device layer 22, and it is possible to curb damage to the device layer 22 (a side opposite to the laser light incidence side) in the object 11.

In the multifocal processing control according to the modification example, the laser light L is modulated by the spatial light modulator 5 such that the converging point C0 of the non-modulated light L0 is positioned outside the object 11 and on a side opposite to a side closer to the converging part 6 than to the object 11 in the Z direction. In other words, in the laser processing method according to the modification example, the converging point C0 of the non-modulated light L0 is positioned outside the object 11 and on a side opposite to a side closer to the converging part 6 than to the object 11 in the Z direction. As a result, it is possible to effectively keep the converging point C0 of the non-modulated light L0 away from the device layer 22 of the object 11.

[Second embodiment] A second embodiment will be described. In the description of the second embodiment, points different from the first embodiment will be described, and redundant descriptions will be omitted.

Figure 10:
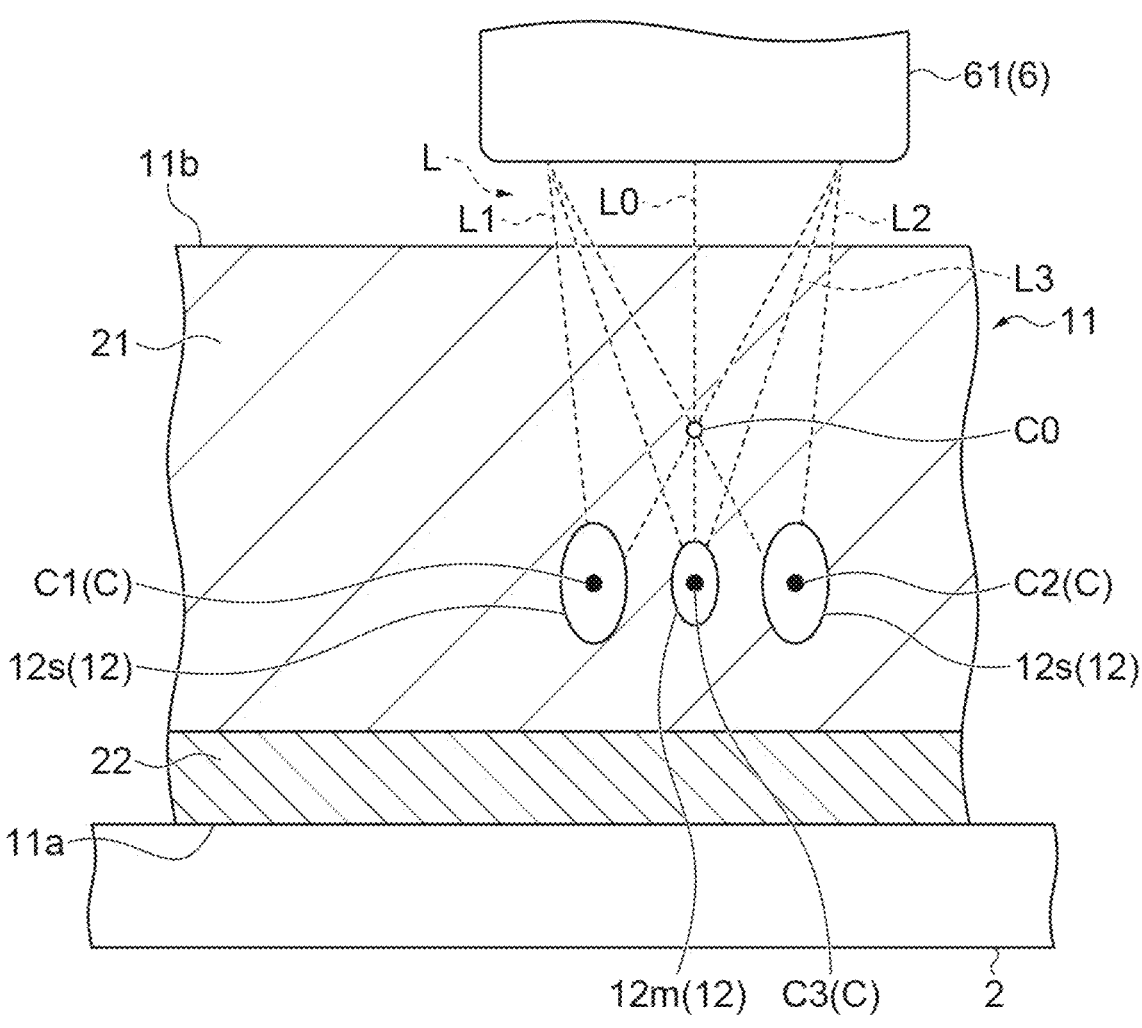
FIG. 10 is a side cross-sectional view of the object for explaining multifocal processing control according to a second embodiment.

As shown in FIG. 10, in multifocal processing control of the second embodiment, the laser light L is modulated by the spatial light modulator 5 such that the laser light L is branched (diffracted) into three rays of processing light L1, L2, and L3, and their converging points C1, C2, and C3 are positioned at positions different from each other in the X direction and/or the Y direction. The processing light L3 is 0th-order light.

In the multifocal processing control, the laser light L is modulated by the spatial light modulator 5 such that the modified region 12 (a modified spot 12m) formed due to converging of the processing light L3 is present between the converging point C0 of the non-modulated light L0 of the laser light L and the front surface 11a (an opposite surface on a side opposite to the laser light incidence surface) in the Z direction. That is, in the multifocal processing control, the modified spot 12m is formed due to the converging of the rays of processing light L1 and L2 out of the rays of processing light L1 to L3 branched from the laser light L, and at the same time, the modified spot 12m is formed between the converging point C0 of the non-modulated light L0 and the front surface 11a in the Z direction (immediately below the converging point C0) due to the converging of the processing light L3, which is the 0th-order light, out of the rays of processing light L1 to L3 branched from the laser light L.

The output of the processing light L3 of the 0th-order light is the smallest among the outputs of the rays of processing light L1 to L3. The modified spot 12m formed due to the converging of the processing light L3 of the 0th-order light is smaller than the modified spot 12s formed by the converging of the rays of processing light L1 and L2. The modified spot 12m is smaller than the modified spot 12s in terms of a degree of contribution to the peeling-off along the virtual plane M1 of the object 11. For example, the output (the energy) of the rays of processing light L1 and L2 related to the modified spot 12s is 18.5 μJ, and the output (the energy) of the processing light L3 related to the smaller modified spot 12m than that is 8 μJ.

As described above, in the laser processing apparatus and the laser processing method of the second embodiment, the laser light L is branched into the plurality of rays of processing light L1 to L3, and the plurality of converging points C1 to C3 of the plurality of rays of processing light L1 to L3 are positioned at positions different from each other in the X direction and/or the Y direction. At this time, the modified region 12 is present between the converging point C0 of the non-modulated light L0 and the front surface 11a (the device layer 22) of the object 11. The modified region 12 can block the non-modulated light L0 such that the non-modulated light L0 does not reach the device layer 22 on a side of the front surface 11a of the object 11. For example, when a temperature rises at and around the converging point C3 of the processing light L3 and absorption of the processing light L3 begins, the leakage light of the non-modulated light L0 is also absorbed at and around the converging point C3. As a result, the amount of leakage of the non-modulated light L0 to the device layer 22 can be curbed within an unaffected range. It is possible to prevent damage from occurring in the device layer 22 due to the non-modulated light L0. That is, it is possible to curb damage to the device layer 22 in the object 11.

In the laser processing apparatus and the laser processing method of the second embodiment, the modified spot 12m is formed between the converging point C0 of the non-modulated light L0 and the front surface 11a in the Z direction due to the converging of the processing light L3 of the 0th-order light included in the plurality of rays of processing light L1 to L3. As a result, the modified spot 12m formed simultaneously with the modified spot 12s can be used to block the non-modulated light L0 such that the non-modulated light L0 does not reach the device layer 22 of the object 11.

In the laser processing apparatus and the laser processing method of the second embodiment, the output of the processing light L3, which is the 0th-order light, is the smallest among the outputs of the plurality of rays of processing light L1 to L3. As a result, it is possible to cause the modified region 12 formed due to the converging of the processing light L3, which is the 0th-order light, less likely to contribute to the peeling-off of the object 11 along the virtual plane M1.

Figure 11:
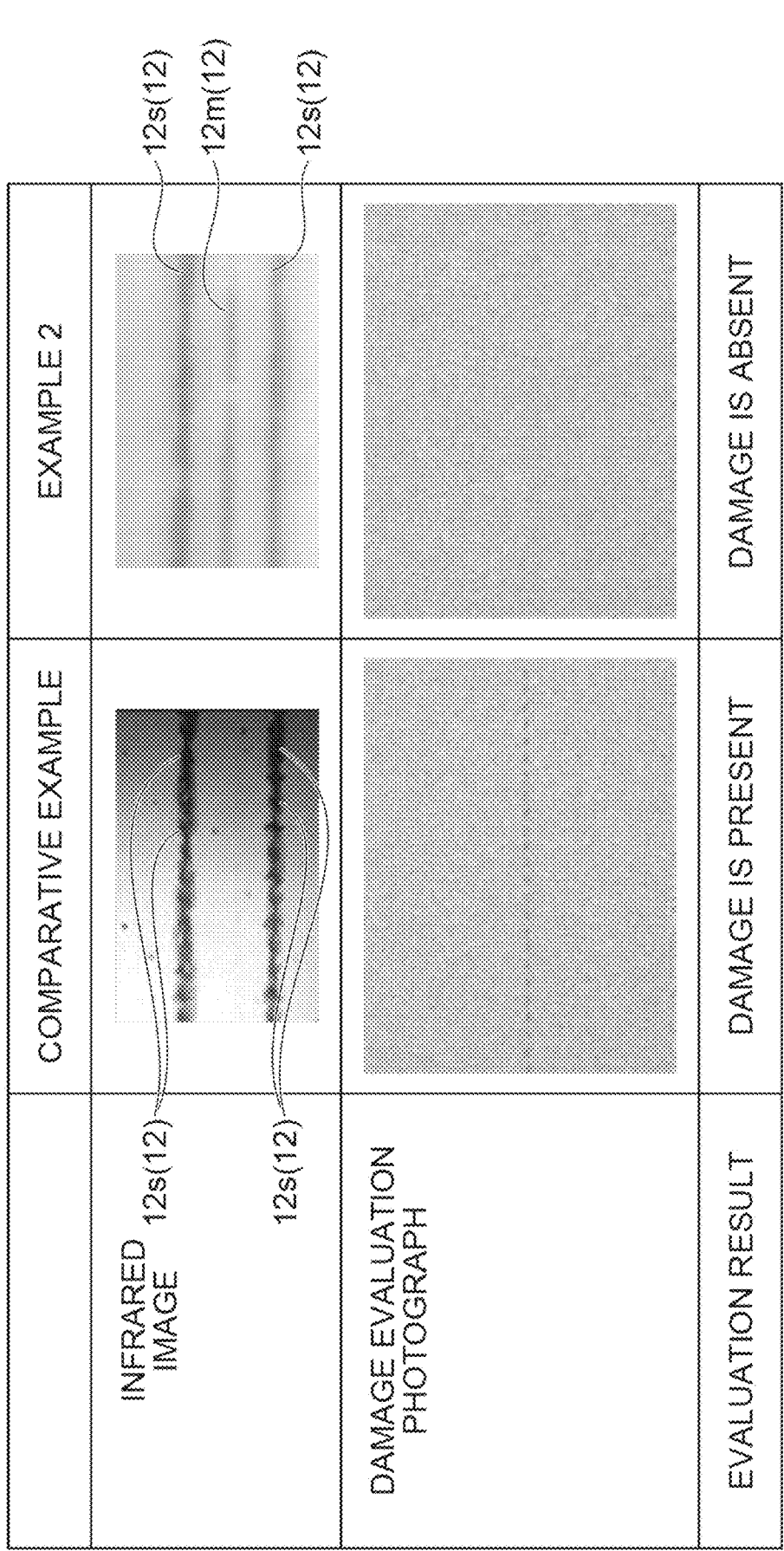
FIG. 11 is a diagram showing a result of an evaluation test for evaluating peeling-off processing according to the second embodiment.

FIG. 11 is a diagram showing a result of an evaluation test for evaluating peeling-off processing according to the second embodiment. In the figure, a comparative example is an example of peeling-off processing according to the general multifocal processing control shown in FIG. 6, for example. Example 2 is an example of peeling-off processing according to the multifocal processing control of the second embodiment described above. The infrared image is an image acquired by the infrared image capturing part 8B and an image at the position of the virtual plane M1. The damage evaluation photograph is a photographic view of the object 11 (the device layer 22) after laser processing, from the front surface 11a. In the image and the photographic view in the figure, the object 11 is scanned with the laser light L along the processing line extending in the left-right direction. As shown in FIG. 11, in the comparative example, the damage caused by the leakage light of the non-modulated light L0 intermittently appears in the device layer 22 along the processing line (see a dotted line). On the other hand, in Example 2, it is understood that avoidance of the damage can be realized.

Figure 12:
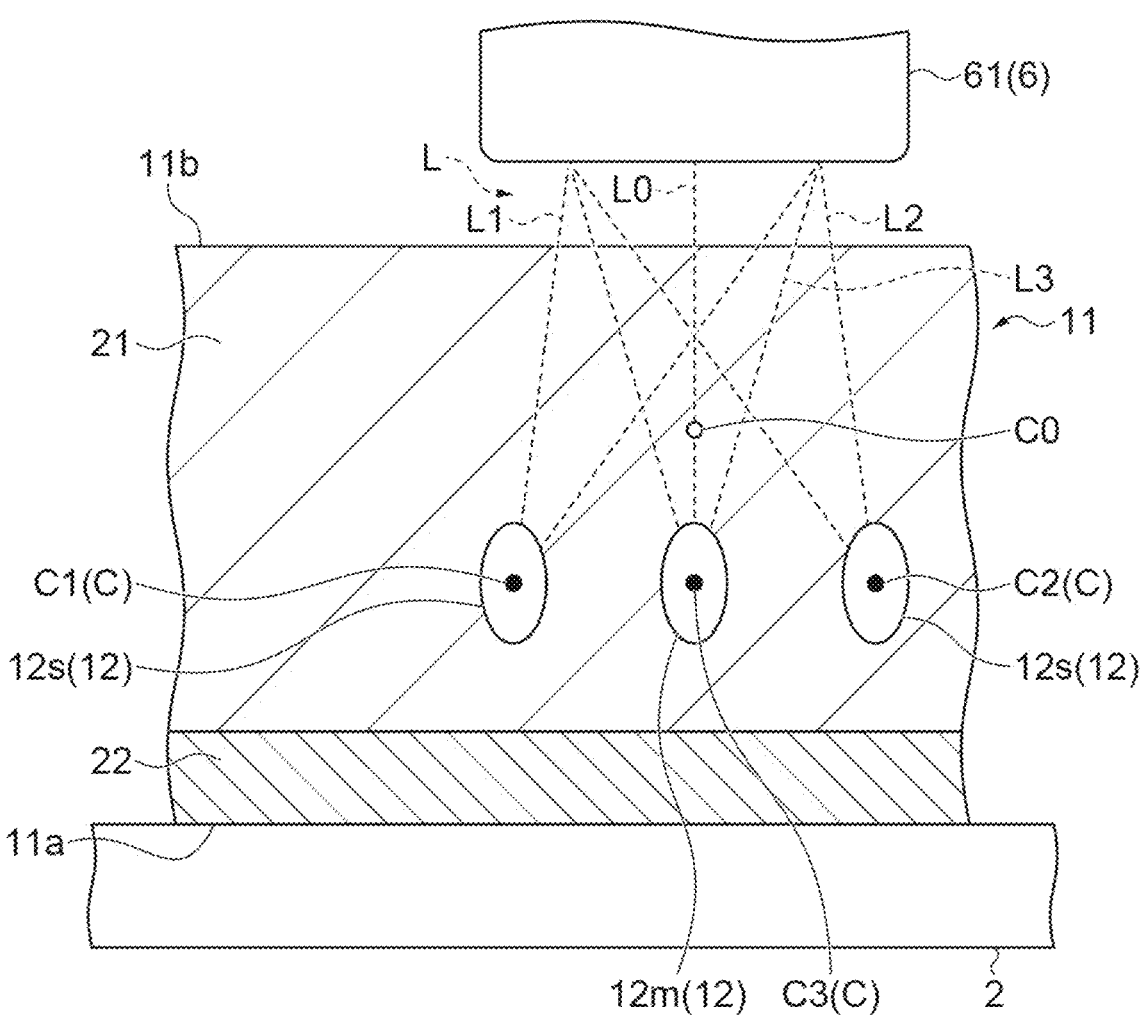
FIG. 12 is a side cross-sectional view of the object for explaining multifocal processing control according to a modification example of the second embodiment.

FIG. 12 is a side cross-sectional view of the object 11 for explaining multifocal processing control according to a modification example of the second embodiment. As shown in FIG. 11, in the multifocal processing control, the output of the processing light L3 of the 0th-order light may be the same as the output of each of the rays of processing light L1 and L2 (at least any one among the plurality of rays of processing light L1 to L3 other than the processing light L3 of the 0th-order light). As a result, it is possible to use the modified region 12 (the modified spot 12m) formed due to the converging of the processing light L3, which is the 0th-order light, for the peeling-off of the object 11 along the virtual plane M1.

Figure 13:
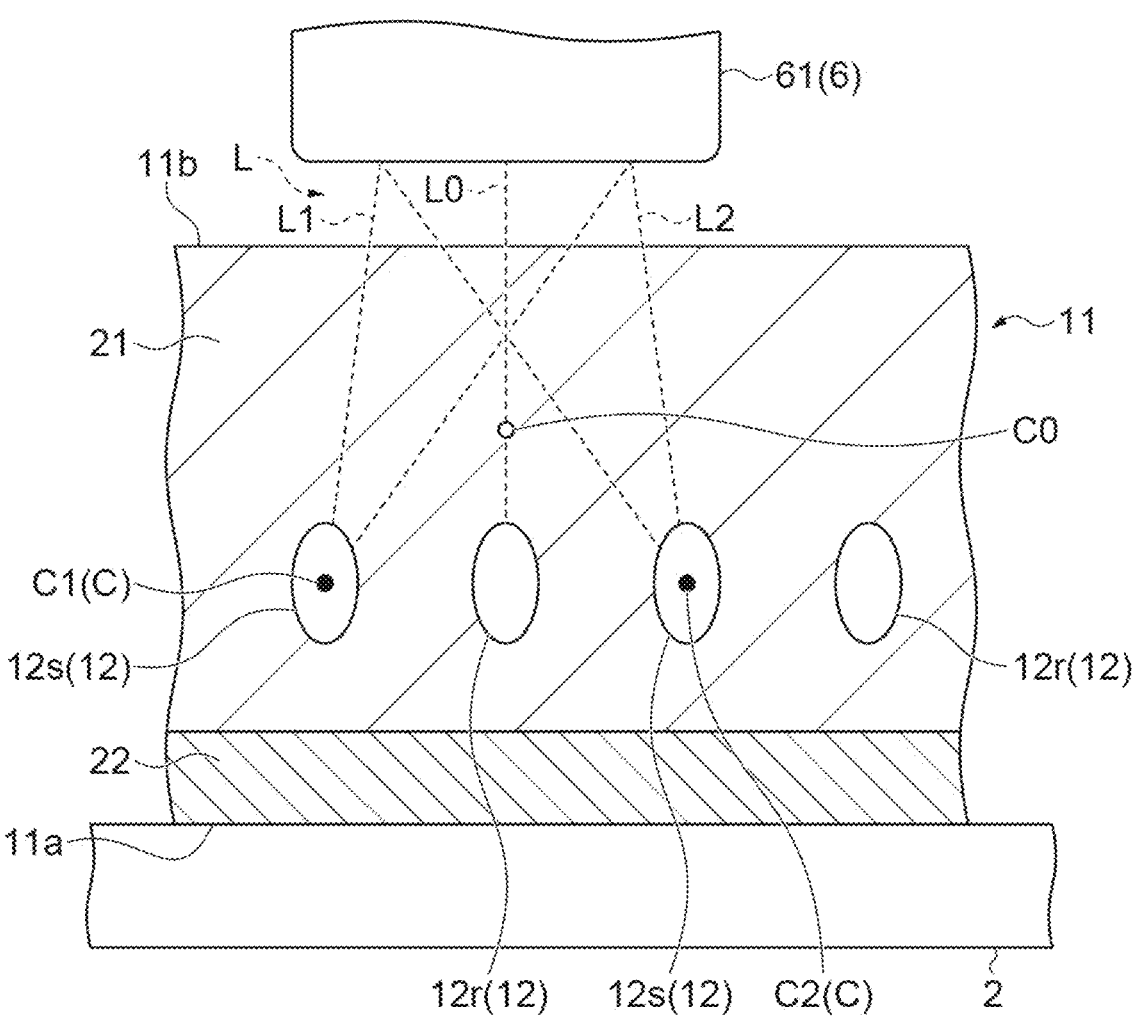
FIG. 13 is a side cross-sectional view of the object for explaining multifocal processing control according to another modification example of the second embodiment.

FIG. 13 is a side cross-sectional view of the object 11 for explaining multifocal processing control according to another modification example of the second embodiment. As shown in FIG. 11, in the multifocal processing control, the laser light L may be modulated by the spatial light modulator 5 to move the converging points C1 and C2 of the rays of the processing light L1 and L2 in a direction perpendicular to the irradiation direction of the laser light L such that the modified region 12 already formed (in the shown example, a modified spot 12r) is positioned between the converging point C0 of the non-modulated light L0 and the front surface 11a in the Z direction.

For example, in multifocal processing control, when the laser light L is branched into two and the rays of processing light L1 and L2 are pulse-emitted, the converging points C1 and C2 of the rays of processing light L1 and L2 may be moved in the X direction and/or the Y direction by the spatial light modulator 5 such that the converging point C0 of the non-modulated light L0 is positioned directly above the modified region 12 already formed due to the pulse emission of the processing light L1 (or the processing light L2) before the above pulse emission. As a result, the modified region 12 already formed can be used to physically block the non-modulated light L0 such that the non-modulated light L0 does not reach the device layer 22.

The laser processing apparatus 1 and the laser processing method according to the second embodiment may include the laser processing apparatus 1 and the laser processing method according to the first embodiment described above. That is, in the second embodiment, the converging points C1 and C2 of the rays of processing light L1 and L2 in the Z direction are positioned on a side opposite to the converging point C0 of the non-modulated light L0 with respect to the ideal converging points C10 and C20 or a side opposite to the ideal converging points C10 and C20 with respect to the condensing point C0 of the unmodulated light L0. As a result, in the second embodiment, the converging point C0 of the non-modulated light L0 may be positioned away from the device layer 22 (a side opposite to the laser light incidence side).

[Third embodiment] A third embodiment will be described. In the description of the third embodiment, points different from the first embodiment will be described, and redundant descriptions will be omitted.

Figure 14:
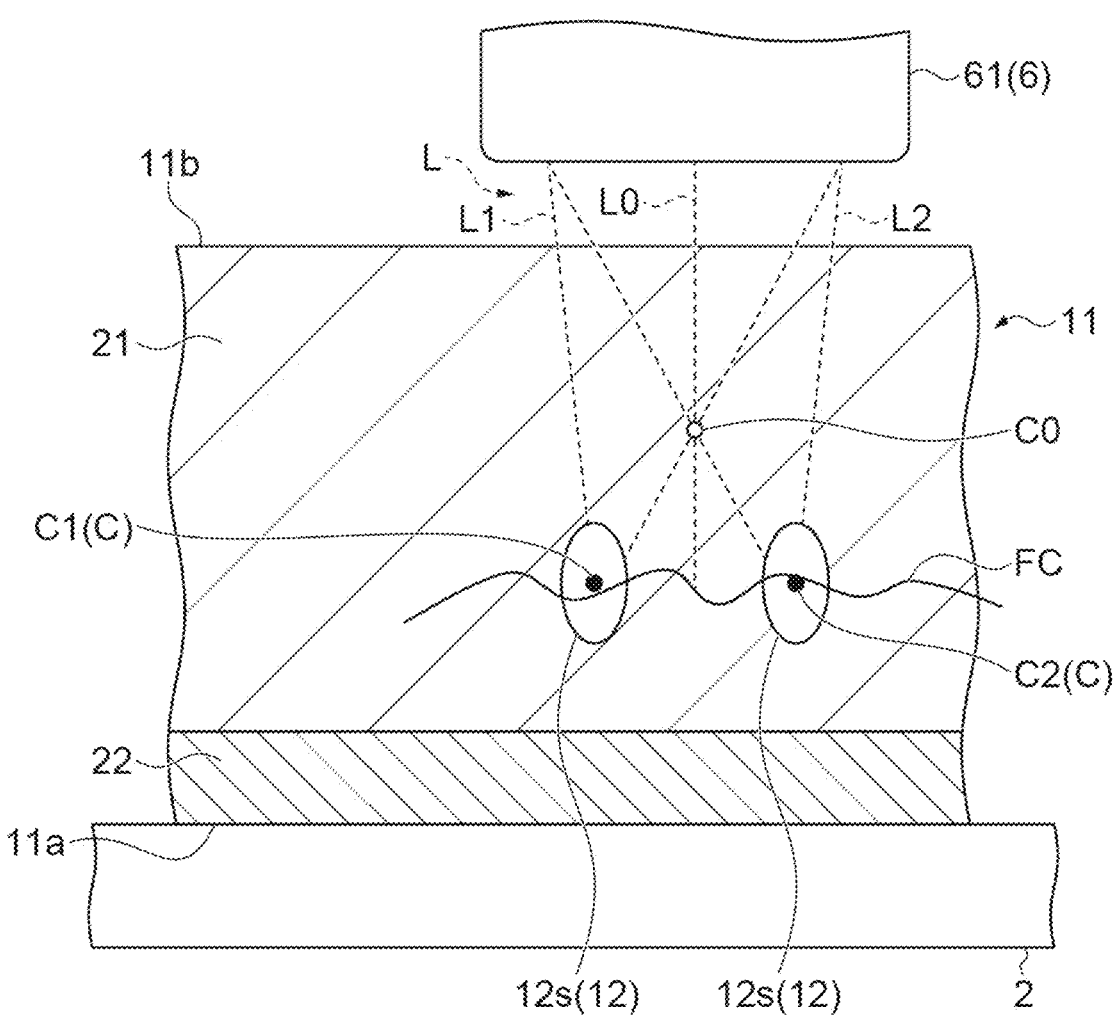
FIG. 14 is a side cross-sectional view of the object for explaining multifocal processing control according to a third embodiment.

As shown in FIG. 14, in the multifocal processing control of the third embodiment, the laser light L is modulated such that fractures FC that extend from the modified spots 12s and stretch along the virtual plane M1 to be connected to each other are present between the converging point C0 of non-modulated light L0 and the front surface 11a (a surface opposite to the laser light incidence surface) of the object 11 in the Z direction.

Figure 15:
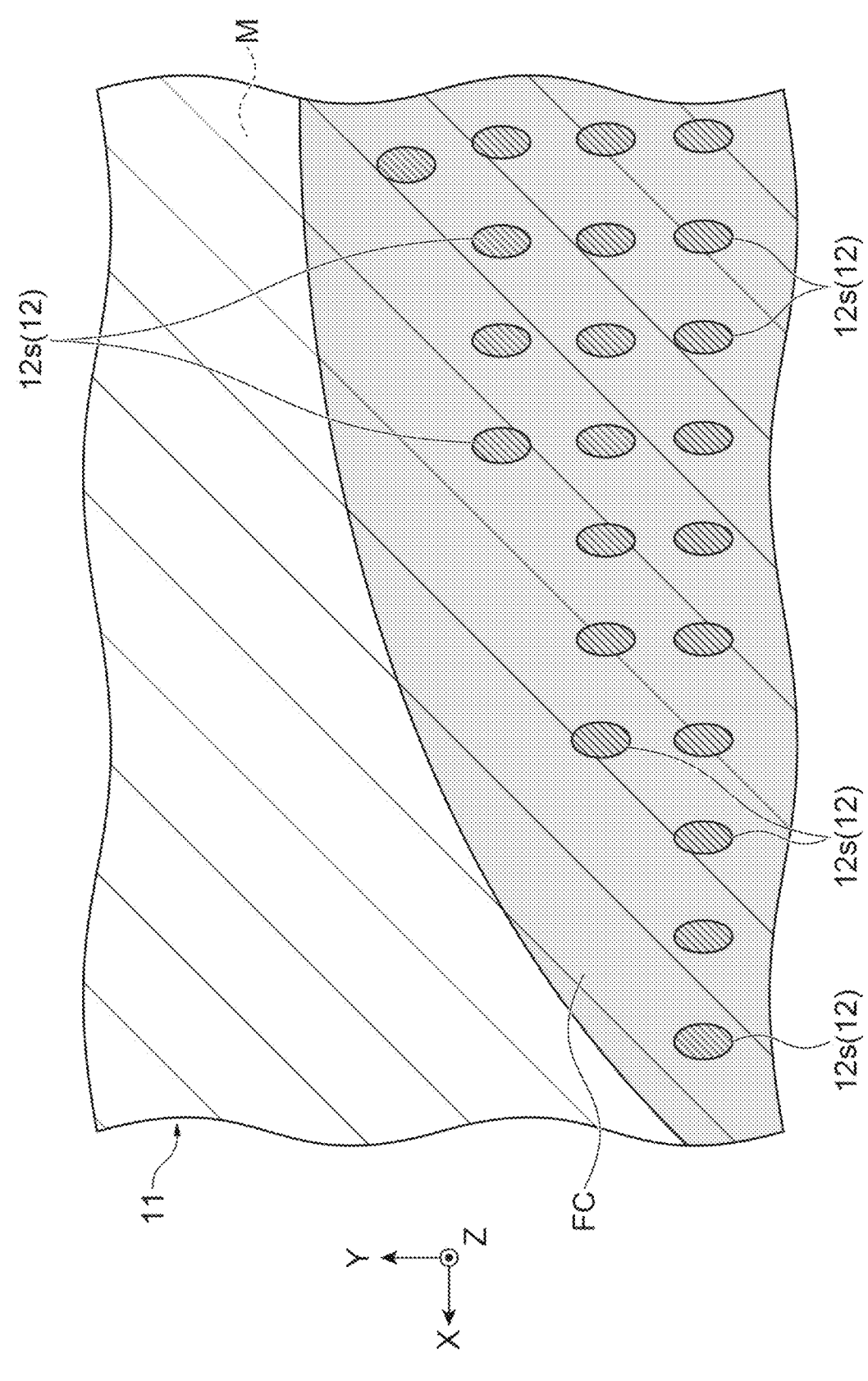
FIG. 15 is a plan cross-sectional view of the object for explaining fractures of the third embodiment.

The fractures FC are connected to each other to spread two-dimensionally along the virtual plane M1 (see FIG. 15). The fractures FC stretch in a direction along the processing line 15 and a direction intersecting with (orthogonal to) the processing line 15 to be connected to each other. The fractures FC are peeling-off fractures. The fractures FC stretch left, right, up, and down on the infrared image, which is acquired by the infrared image capturing part 8B, at the position of the virtual plane M1 and are connected to each other across the plurality of processing lines 15. The fractures FC can be realized in a case where the processing state is a slicing full cut state. The slicing full cut state is a state in which the fractures FC extend from the modified spots 12s and the modified spots 12s cannot be checked on the infrared image (a space or gap formed by the fractures FC is checked) (see an infrared image of Example 3 in FIG. 16).

Processing conditions for realizing such fractures FC are conditions (slicing full-cut conditions) in which various processing parameters are appropriately set on the basis of the known technique such that the processing state becomes the slicing full-cut state. As the slicing full cut conditions are, for example, an output of the laser light L is 3.7 W, a pulse energy (a converted value assuming 20% loss in branching) is 18.5 μJ, a pulse width is 700 ns, branch pitches BPx and BPy are 10 μm to 30 μm (especially a branch pitch BPy is 30 μm), a processing speed is 800 mm/s, a pulse pitch PP is 10 μm, and a pulse width is 700 ns. In the multifocal processing control, laser processing is executed using the slicing full cut conditions as the processing conditions.

As described above, in the laser processing apparatus and the laser processing method of the third embodiment, the laser light L is branched into the plurality of rays of processing light L1 to L3, and the plurality of converging points C1 to C3 of the plurality of rays of processing light L1 to L3 are positioned at positions different from each other in the X direction and/or the Y direction. At this time, fractures FC that extend from the modified spots 12s and stretch along the virtual plane M1 to be connected to each other are present between the converging point C0 of the non-modulated light L0 of the laser light L and the front surface 11a of the object 11. The fractures FC can block the non-modulated light L0 such that the non-modulated light L0 does not reach the device layer 22 on a side of the front surface 11a in the object 11. Therefore, it is possible to prevent damage from occurring in the device layer 22 of the object 11 due to the non-modulated light L0. That is, it is possible to curb damage to the device layer 22 in the object 11.

In the laser processing apparatus and laser processing method of the third embodiment, the fractures FC extending from the plurality of modified spots 12s are connected to each other to spread two-dimensionally along the virtual plane M1. Such fractures FC can effectively block the non-modulated light L0.

In the laser processing apparatus and the laser processing method of the third embodiment, the fractures FC extending from the plurality of modified spots 12s stretch in a direction along the processing line 15 and a direction intersecting with the processing line 15 to be connected to each other. Such fractures FC can effectively block the non-modulated light L0.

In the third embodiment, as long as it is within a range in which the fractures FC stretch (see a translucent range in FIG. 15), the converging points C1 and C2 of the rays of processing light L1 and L2 may be moved in the X direction and/or the Y direction by the spatial light modulator 5 such that the converging point C0 of the non-modulated light L0 is positioned at an arbitrary position directly above the range. That is, the converging points C1 and C2 of the rays of the processing light L1 and L2 may be moved in a direction perpendicular to the irradiation direction of the laser light L such that the fractures FC are present between the converging point C0 of the non-modulated light L0 and the front surface 11a in the Z direction. As a result, it is possible to reliably position the fractures FC between the converging point C0 of the non-modulated light L0 and the front surface 11a in the Z direction.

FIG. 16 is a diagram showing a result of an evaluation test for evaluating peeling-off processing according to the third embodiment. In the figure, a comparative example is an example of peeling-off processing according to the general multifocal processing control shown in FIG. 6, for example. Example 3 is an example of peeling-off processing according to the multifocal processing control of the third embodiment described above. The infrared image is an image acquired by the infrared image capturing part 8B and an image at the position of the virtual plane M1. The damage evaluation photograph is a photographic view of the object 11 (the device layer 22) after laser processing, from the front surface 11a. In the image and the photographic view in the figure, the object 11 is scanned with the laser light L along the processing line extending in the left-right direction. As shown in FIG. 16, in the comparative example, the damage caused by the leakage light of the non-modulated light L0 intermittently appears in the device layer 22 along the processing line (see a dotted line in the figure). On the other hand, in Example 3, it is understood that avoidance of the damage can be realized.

The laser processing apparatus and the laser processing method according to the third embodiment may include the laser processing apparatus 1 and the laser processing method according to the first embodiment described above. That is, in the third embodiment, the converging points C1 and C2 of the rays of processing light L1 and L2 in the Z direction are positioned on a side opposite to the converging point C0 of the non-modulated light L0 with respect to the ideal converging points C10 and C20 or a side opposite to the ideal converging points C10 and C20 with respect to the condensing point C0 of the unmodulated light L0. As a result, in the third embodiment, the converging point C0 of the non-modulated light L0 may be positioned away from the device layer 22 (a side opposite to the laser light incidence side). Instead of or in addition to this, the laser processing apparatus and the laser processing method according to the third embodiment may include the laser processing apparatus and the laser processing method according to the second embodiment described above. That is, in the third embodiment, the modified region 12 may be present between the converging point C0 of the non-modulated light L0 and the front surface 11a (the device layer 22) of the object 11.

[Modification Examples] As described above, an aspect of the present invention is not limited to the embodiments described above.

In the above embodiments, the number of branches of the laser light L (the number of rays of processing light) is not limited and may be four or more branches in addition to the two branches and the three branches described above. In the above embodiments, the intervals between the converging points of the plurality of rays of processing light may be the same or different. In the above embodiments, both of the laser processing head H and the support part 2 are moved by the moving mechanism 9, but at least one of them may be moved by the moving mechanism 9.

In the above embodiments, the effect of curbing the damage to the device layer 22 on a side opposite to the laser light incidence side in the object 11 is exhibited, but the present invention are not limited to the effect of curbing the damage to the device layer 22. According to the above embodiments, it is possible to curb the damage to the front surface 11a which is a surface opposite to the laser light incidence surface in the object 11. According to the above embodiments, it is possible to curb the damage to a portion on a side of the front surface 11a in the object 11. In short, according to the above embodiments, it is possible to curb the damage to a side opposite to the laser light incidence side in the object 11.

In the above embodiment, the processing line is not limited to the spiral shape, and processing lines of various shapes may be set on the object 11. The processing line may include, for example, a plurality of linear lines arranged in a predetermined direction. The plurality of linear lines may or may not be connected to each other partially or entirely. The above embodiments may include a plurality of laser processing heads as the irradiation unit. In the above embodiments, the spatial light modulator 5 is not limited to the reflective spatial light modulator, and a transmissive spatial light modulator may be employed.

In the above embodiments, the type of the object 11, the shape of the object 11, the size of the object 11, the number and direction of the crystal orientations of the object 11, and the plane orientation of the main surface of the object 11 are not particularly limited. In the above embodiment, the object 11 may be formed including a crystalline material having a crystalline structure, or may be formed including, instead of or in addition to this, a non-crystalline material having a non-crystalline structure (amorphous structure). The crystalline material may be either an anisotropic crystal or an isotropic crystal. For example, the object 11 may include a substrate formed of at least any one of gallium nitride (GaN), silicon (Si), silicon carbide (SiC), LiTaO$_3$, diamond, GaOx, sapphire (Al$_2$O$_3$), gallium arsenide, indium phosphide, glass, and alkali-free glass.

In the above embodiments, the modified region 12 may be, for example, a crystalline region, a re-crystalline region, or a gettering region formed in the object 11. The crystalline region is a region in which a structure of the object 11 before processing is maintained. The re-crystalline region is a region that is solidified as a single crystal or polycrystal when it is resolidified after being once vaporized, plasmatized, or melted. The gettering region is a region in which a gettering effect of collecting and capturing impurities such as heavy metals is exhibited and may be formed continuously or intermittently. The above embodiments may be applied to processing such as ablation.

In the first embodiment, as a result of the Z-direction shift that brings the converging points C1 and C2 of the plurality of ray of processing light L1 and L2 close to the device layer 22 by the Z-direction shift amount with respect to the ideal converging points C10 and C20, the converging point C0 of the non-modulated light L0 is positioned on the laser light incidence side in the object 11 in the Z direction, but the present invention is not limited to this. As a result of the Z-direction shift, the converging point C0 of the non-modulated light L0 may be positioned at a central portion in the object 11 in the Z direction.

Various materials and shapes can be applied to each configuration in the embodiments and the modification examples described above without being limited to the materials and shapes described above. Further, the configuration in each of the embodiments or the modification examples described above can be arbitrarily applied to the configuration in another embodiment or modification example.

REFERENCE SIGNS LIST

1 Laser processing apparatus
2 Support part
5 Spatial light modulator
6 Converging part
9 Moving mechanism
10 Controller
11 Object
11a Front surface (side opposite to laser light incidence surface)
11b Back surface (laser light incidence surface)
12 Modified region
12s, 12m, 12r Modified spot
15 Processing line
21 Substrate
22 Device layer (functional element layer)
103 Input reception unit
C0 Converging point of non-modulated light
C1, C2, C3 Converging point of processing light
C10, C20 Ideal converging point
FC Fracture
H Laser processing head
L Laser light
L0 Non-modulated light
L1, L2 Processing light
L3 Processing light (0th-order light)
M1 Virtual plane
The invention claimed is:
1. A laser processing apparatus that forms a modified region along a virtual plane in an object by irradiating the object with laser light, the apparatus comprising:
a support part configured to support the object;
an irradiation unit configured to irradiate the object supported by the support part with the laser light;

a moving mechanism configured to move at least one of the support part and the irradiation unit; and a controller configured to control the irradiation unit and the moving mechanism, wherein the irradiation unit has a spatial light modulator that modulates the laser light and at least one lens that converges the laser light modulated by the spatial light modulator on the object, wherein the controller executes first control for causing the laser light to be modulated by the spatial light modulator such that the laser light is branched into a plurality of rays of processing light and a plurality of converging points of the plurality of rays of processing light are positioned in different positions in a direction perpendicular to an irradiation direction of the laser light, and wherein, in the first control, the laser light is modulated such that fractures that extend from a plurality of modified spots constituting the modified region and stretch along the virtual plane to be connected to each other are present between a converging point of non-modulated light of the laser light and an opposite surface on a side opposite to a laser light incidence surface of the object in the irradiation direction.

2. The laser processing apparatus according to claim 1, wherein the fractures extending from the plurality of modified spots are connected to each other to spread two-dimensionally along the virtual plane.

3. The laser processing apparatus according to claim 1, wherein the object includes a substrate and a functional element layer provided on a side of the substrate opposite to a laser light incidence side.

4. The laser processing apparatus according to claim 1, wherein, in the first control, the plurality of converging points of the plurality of rays of processing light are moved in the direction perpendicular to the irradiation direction of the laser light such that the fractures are present between the converging point of the non-modulated light of the laser light and the opposite surface in the irradiation direction.

5. The laser processing apparatus according to claim 1, wherein the controller executes second control for causing at least one of the support part and the irradiation unit to be moved by the moving mechanism such that positions of the converging points of the plurality of rays of processing light move along the virtual plane.

6. The laser processing apparatus according to claim 5, wherein, in the second control, at least one of the support part and the irradiation unit is moved such that the positions of the converging points of the plurality of rays of processing light move along a processing line, and wherein the fractures extending from the plurality of modified spots stretch in a direction along the processing line and a direction intersecting with the processing line to be connected to each other.

7. The laser processing apparatus according to claim 1, wherein, in the first control, the laser light is modulated such that, in the irradiation direction, the converging point of each of the plurality of rays of processing light is positioned on a side opposite to the converging point of the non-modulated light of the laser light with respect to an ideal converging point of the processing light, or the converging point of each of the plurality of rays of processing light is positioned on a side opposite to the ideal converging point of the processing light with respect to the converging point of the non-modulated light.

8. The laser processing apparatus according to claim 1, wherein, in the first control, the laser light is modulated such that the modified region is present between the converging point of the non-modulated light of the laser light and the opposite surface of the object in the irradiation direction.

9. A laser processing method in which a modified region is formed along a virtual plane in an object by irradiating the object with laser light, the method comprising:

a step of branching the laser light into a plurality of rays of processing light and positioning a plurality of converging points of the plurality of rays of processing light in different positions in a direction perpendicular to an irradiation direction of the laser light, and wherein, in the step, fractures that extend from a plurality of modified spots constituting the modified region and stretch along the virtual plane to be connected to each other are caused to be present between a converging point of non-modulated light of the laser light and an opposite surface on a side opposite to a laser light incidence surface of the object in the irradiation direction.

* * * * *